(12) United States Patent
Nguyen

(10) Patent No.: US 8,373,757 B1
(45) Date of Patent: Feb. 12, 2013

(54) FLAT FIELD CORRECTION FOR INFRARED CAMERAS

(75) Inventor: Vu L. Nguyen, Goleta, CA (US)

(73) Assignee: Flir Systems, Inc., Wilsonville, OR (US)

( * ) Notice: Subject to any disclaimer, the term of this patent is extended or adjusted under 35 U.S.C. 154(b) by 892 days.

(21) Appl. No.: 12/391,156

(22) Filed: Feb. 23, 2009

(51) Int. Cl.
*H04N 5/232* (2006.01)

(52) U.S. Cl. ............... 348/164; 250/252.1; 250/330; 250/332

(58) Field of Classification Search .............. 348/164, 348/345; 250/252.1, 339.04, 347
See application file for complete search history.

(56) References Cited

U.S. PATENT DOCUMENTS

| | | | |
|---|---|---|---|
| 6,184,529 B1* | 2/2001 | Contini | 250/347 |
| 6,812,465 B2 | 11/2004 | Parrish et al. | |
| 6,875,979 B2 | 4/2005 | Cope | |
| 6,929,410 B2 | 8/2005 | Nguyen et al. | |
| 7,470,902 B1 | 12/2008 | Kraemer et al. | |
| 2003/0025067 A1* | 2/2003 | Tsai et al. | 250/208.2 |
| 2005/0231627 A1* | 10/2005 | Murphy et al. | 348/345 |
| 2008/0210872 A1* | 9/2008 | Grimberg | 250/339.04 |
| 2009/0272888 A1* | 11/2009 | Nugent et al. | 250/252.1 |

FOREIGN PATENT DOCUMENTS

JP 4207588 B2 1/2009

OTHER PUBLICATIONS

U.S. Appl. No. 12/103,658, Nicholas Hogasten.

* cited by examiner

*Primary Examiner* — Mehrdad Dastouri
*Assistant Examiner* — Obafemi Sosanya
(74) *Attorney, Agent, or Firm* — Haynes and Boone, LLP

(57) ABSTRACT

Various techniques are provided to perform flat field correction for infrared cameras. In one example, a method of calibrating an infrared camera includes calibrating a focal plane array (FPA) of the infrared camera to an external scene to determine a set of flat field correction values associated with a first optical path from the external scene to the FPA. The method also includes calibrating the FPA to a shutter of the infrared camera to determine a set of flat field correction values associated with a second optical path from the shutter to the FPA. The method also includes using the flat field correction values associated with the first and second optical paths to calculate a set of supplemental flat field correction values to apply to thermal image data obtained with the infrared camera. The method also includes storing the supplemental flat field correction values.

27 Claims, 4 Drawing Sheets

FLAT FIELD CORRECTION FOR INFRARED CAMERAS

TECHNICAL FIELD

The invention relates generally to thermal imaging systems and, more particularly, to systems and methods for calibrating thermal imaging devices, such as focal plane arrays.

BACKGROUND

Focal plane arrays (FPAs) which detect infrared radiation are well known in the art and are used by infrared cameras to provide thermal images. For example, infrared radiation passing through an optical path of the infrared camera is received by infrared detectors of the FPA, which provide thermal image data for pixels of a two-dimensional image.

The quality of thermal images provided by FPAs may be degraded due to non-uniform responses among the individual infrared detectors to incident infrared radiation. Factors contributing to the performance degradation may include, for example, variations in the physical characteristics (i.e., dimensions and locations), infrared radiation absorption coefficient, resistance, temperature coefficient of resistance (TCR), heat capacity, and/or thermal conductivity of the individual infrared detectors. FPA performance may also be degraded by non-uniform out-of-field infrared radiation from surrounding mechanical components. Because the magnitude of the non-uniformity may be large in comparison to the magnitude of the actual response due to the incident infrared radiation, various techniques are typically used to compensate for the non-uniformity and obtain a desirable signal-to-noise ratio.

For example, the FPA may be calibrated over one or more levels of photon flux by inserting a shutter (i.e., an optical obscuration also referred to as a calibration flag) into the optical path of the infrared camera. The temperature of the shutter may be adjusted to emulate a thermal black body detected by the FPA. The FPA takes one or more data frames or snapshots of the shutter to calibrate its response, and the collected data may then be used to calibrate the FPA to provide a more uniform response. The shutter location is often chosen to be as close as possible to the FPA (i.e., between the FPA and the lens) to reduce the shutter size and thus provide a more compact infrared camera.

Although the above-described shutter calibration technique permits calibration of the FPA for the portion of the optical path between the shutter and the FPA, it does not calibrate the FPA to correct for the thermal non-uniformity of the shutter's paddle and the out-of-field infrared radiation caused by other portions of the optical path including, for example, lenses, windows, mounting hardware, or other components of the infrared camera which may be implemented in front of the shutter (i.e., not between the shutter and the FPA). Such non-uniformities may further degrade FPA performance by radiometrically distorting the thermal image data detected by the FPA. Accordingly, there is a need for an improved approach to the calibration of an FPA within an infrared camera.

SUMMARY

One or more embodiments may be used to provide flat field correction for infrared cameras. For example, infrared detectors of an infrared camera may be calibrated to determine flat field correction values, which may be used to correct for non-uniformities associated with optical paths of the infrared camera. Supplemental flat field correction values may also be determined and applied to thermal image data to further correct for such non-uniformities.

In one embodiment, a method of calibrating an infrared camera includes calibrating a focal plane array (FPA) of the infrared camera to an external scene to determine a set of flat field correction values associated with a first optical path from the external scene to the FPA; calibrating the FPA to a shutter of the infrared camera to determine a set of flat field correction values associated with a second optical path from the shutter to the FPA; using the flat field correction values associated with the first and second optical paths to calculate a set of supplemental flat field correction values to apply to thermal image data obtained with the infrared camera; and storing the supplemental flat field correction values.

In another embodiment, an infrared camera includes a focal plane array (FPA) adapted to capture thermal image data in response to infrared radiation received by the FPA; a shutter; a memory adapted to store a set of supplemental flat field correction values based on a first optical path from an external scene to the FPA; and a processor adapted to: calibrate the FPA to the shutter to determine a set of flat field correction values associated with a second optical path from the shutter to the FPA, and apply the supplemental flat field correction values to the thermal image data to adjust for non-uniformities associated with the first optical path.

In another embodiment, a method of processing thermal image data captured by an infrared camera includes capturing thermal image data at a focal plane array (FPA) of the infrared camera; and applying a set of supplemental flat field correction values to the thermal image data to adjust for non-uniformities associated with the infrared camera, wherein the supplemental flat field correction values are based on differences between a set of flat field correction values obtained from a calibration of the FPA to an external scene and a set of flat field correction values obtained from a calibration of the FPA to a shutter of the infrared camera.

The scope of the invention is defined by the claims. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
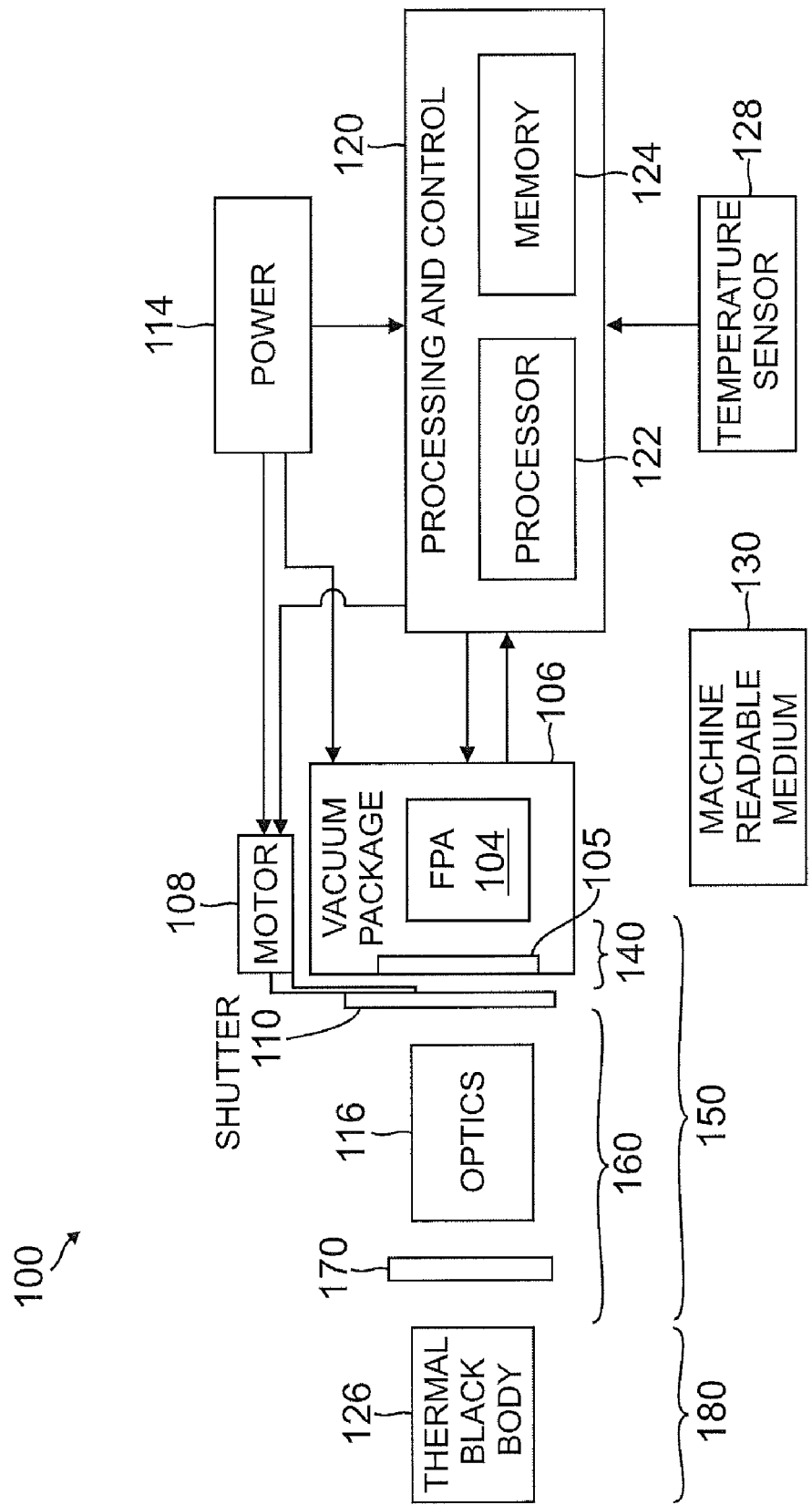
FIG. 1 illustrates an infrared camera in accordance with an embodiment of the invention.

FIG. 1 illustrates an infrared camera 100 in accordance with an embodiment of the invention. Infrared camera 100 includes an infrared detector package 106, a motor 108, a shutter 110, a power block 114, an optics block 116, a processing and control block 120, a temperature sensor 128, and an optional window 170.

In one example, infrared camera 100 may represent any type of infrared camera or thermal imaging system, is not limited to any specific embodiment disclosed herein, and may be implemented as desired for particular applications. Accordingly, in one embodiment, the components illustrated in FIG. 1 may be implemented as a standalone infrared camera. In another embodiment, the components of FIG. 1 may be distributed between a plurality of different devices. For example, processing and control block 120 may be implemented by one or more external computer systems that interface with infrared camera 100 (e.g., over a network or other appropriate communication medium). In another embodiment, infrared camera 100 may be implemented with greater, fewer, and/or different components than those illustrated in FIG. 1 as appropriate for particular applications.

Infrared energy received from a scene 180 in front of infrared camera 100 passes along an optical path 150 through optics block 116 (e.g., athermalized optics including one or more lenses for focusing infrared radiation on infrared detector package 106) to infrared detector package 106 (e.g., a vacuum package assembly). In one embodiment, infrared detector package 106 and optics block 116 may be sealed inside a chamber (not shown) including window 170 (e.g., a heated or temperature controlled protective window) positioned between optics block 116 and scene 180.

In another embodiment, one or more lenses of optics block 116 may be selectively inserted into optical path 150. Accordingly, infrared camera 110 may be operated with various lenses (e.g., 25 mm, 35 mm, 50 mm, 140 mm, or others) as may be desired for particular applications. The different types of lenses may contribute to different non-uniformities in the propagation of infrared radiation along optical path 150.

Infrared detector package 106 includes a focal plane array (FPA) 104 to detect infrared radiation passing through a window 105 and provide thermal image data in response thereto. FPA 104 may be implemented using various types of infrared detectors (e.g., quantum wells, microbolometers, or other types) as may be desired for particular implementations.

In order to calibrate FPA 104, a thermal black body 126 may be positioned in scene 180 such that thermal black body 126 fully subtends the lens field of view (FOV) of infrared camera 100. By operating infrared camera 100 in a thermally stable environment (e.g., corresponding to a thermal steady state condition such as room temperature) and capturing thermal images of thermal black body 126, flat field correction values may be determined which may be applied to thermal image data received from FPA 104 to correct for non-uniformities (e.g., thermal loading or optical irregularities) present in optical path 150.

Shutter 110 may be selectively inserted into optical path 150 through the operation of motor 108 to facilitate calibration of FPA 104. For example, in the embodiment illustrated in FIG. 1, shutter 110 is shown inserted into optical path 150. While inserted into optical path 150, shutter 110 substantially blocks infrared radiation from passing to FPA 104 from scene 180. In this case, FPA 104 instead detects infrared radiation received from shutter 110 along an optical path 140, to the exclusion of infrared radiation received along an optical path 160. In one embodiment, shutter 110 may be implemented to approximate a thermal black body in front of infrared detector package 106. By calibrating FPA 104 to shutter 110, flat field correction values may be determined which may be applied to infrared detectors of FPA 104 in order to correct for non-uniformities present in optical path 140, as discussed further herein.

Power block 114 may include a circuit board power subsystem (e.g., a power board) for infrared camera 100. For example, power block 114 may provide various power conversion operations and desired power supply voltages, power on-off switching, and various other operations (e.g., a shutter driver for motor 108), including an interface to a battery or external power supply, as would be understood by one skilled in the art.

Processing and control block 120 includes a processor 122 and a memory 124. Processor 122 may be configured with appropriate software (e.g., one or more computer programs for execution by processor 122) stored on a machine readable medium 130 (e.g., a CD-ROM or other appropriate medium) and/or in memory 124 to instruct processor 122 to perform one or more of the operations described herein. Processor 122 and memory 124 may be implemented in accordance with any desired combination of one or more processors and/or one or more memories as desired for particular implementations.

Processing and control block 120 receives thermal image data captured by infrared detectors of FPA 104 and processes the thermal image data to perform a flat field correction on the data to account for non-uniformities associated with the infrared detectors of FPA 104 and other non-uniformities associated with other portions of optical path 150 (e.g., non-uniformities associated with optics block 116 or other portions of infrared camera 100). The corrected thermal image data may be used to provide corrected thermal images which account for aberrations in optical path 150.

Processing and control block 120 also interfaces with motor 108 to control the insertion and removal of shutter 110 from optical path 150. Advantageously, processing and control block 120 may receive thermal image data captured by FPA 104 either while shutter 110 is inserted into optical path 150 or while shutter 110 is removed from optical path 150. As a result, processing and control block 120 may selectively calibrate FPA 104 along either optical path 140 (e.g., while shutter 110 is inserted in optical path 150) or optical path 150 (e.g., while shutter 110 is removed from optical path 150). For example, in one embodiment, processing and control block 120 may determine flat field correction values (e.g., gain and offset values) associated with individual infrared detectors of FPA 104 to correct for non-uniformities associated with the infrared detectors for either optical path 140 or optical path 150. As further described herein, the flat field correction values may be further processed to determine supplemental flat field correction values to correct for non-uniformities associated with the infrared detectors for optical path 160.

Processing and control block 120 also interfaces with temperature sensor 128 to determine a temperature and a rate of temperature change of the ambient environment in which infrared camera 100 is positioned and/or one or more components of infrared camera 100 (e.g., FPA 104, infrared detector package 106, motor 108, shutter 110, power block 114, optics block 116, processing and control block 120, window 170, and/or other components). Processing and control block 120 may be configured to scale the supplemental flat field correction values based on temperature readings obtained from temperature sensor 128.

Temperature sensor 128 may be positioned in any desired location of infrared camera 100 (e.g., optics block 116, FPA 104, mechanical components near optical path 150 such as shutter 110 and/or window 170, and/or other locations of infrared camera 100) and/or in the ambient environment in which infrared camera 100 is positioned. For example, in one embodiment, temperature sensor 128 is positioned on FPA 104 and window 170.

Figure 2:
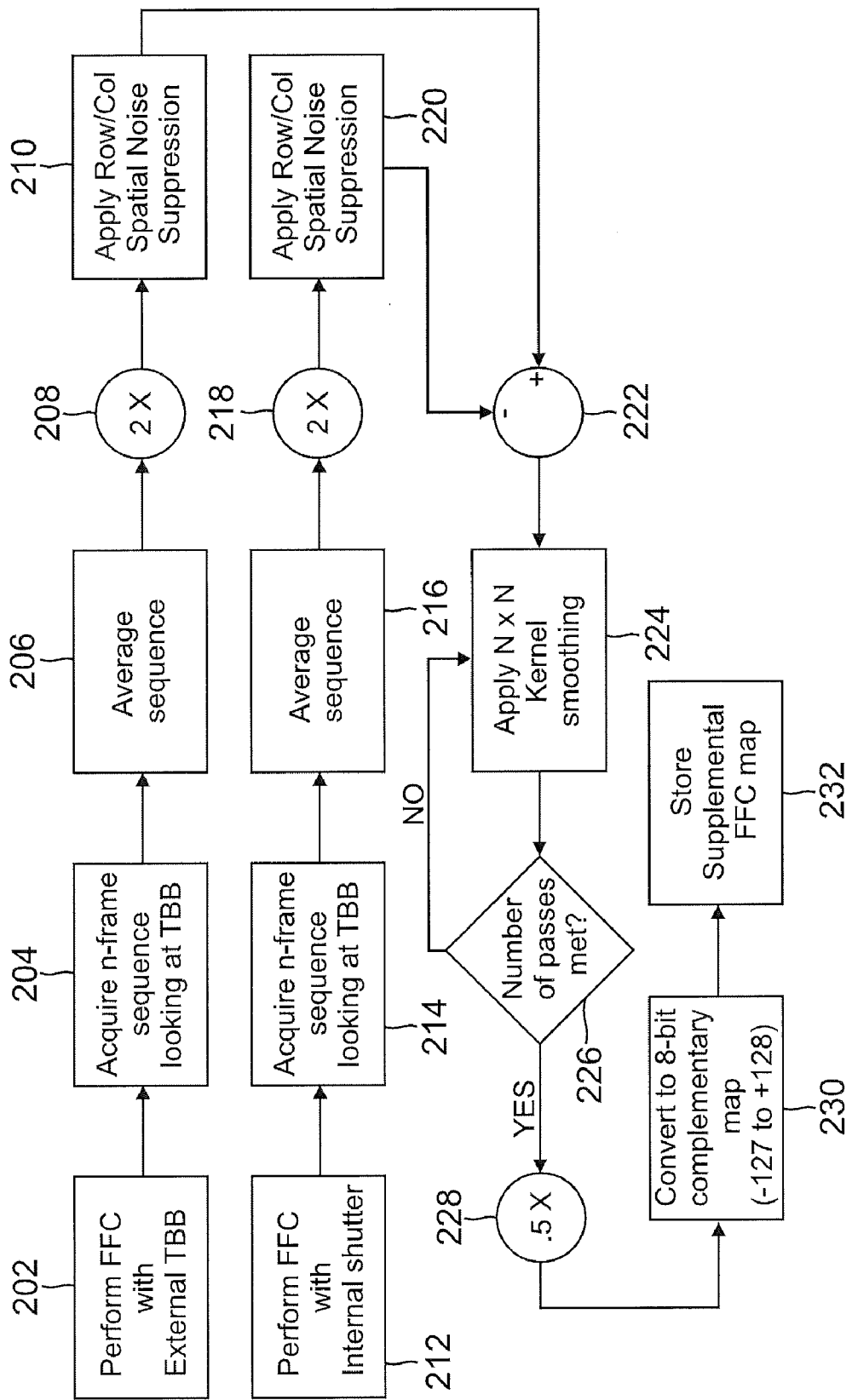
FIG. 2 illustrates a process of determining supplemental flat field correction values in accordance with an embodiment of the invention.

FIG. 2 illustrates a process of determining supplemental flat field correction values in accordance with an embodiment of the invention. In one example, the process of FIG. 2 may be performed by a provider of infrared camera 100 (e.g., a manufacturer, designer, or other party providing infrared camera 100). In this example, supplemental flat field correction values may be prepared by the provider and stored by infrared camera 100 to be subsequently used during operation of infrared camera 100 by a user. In another example, the process of FIG. 2 may be performed by a user of infrared camera 100. In yet another example, performance of the process of FIG. 2 may be distributed between a provider of infrared camera 100 and a user of infrared camera 100.

In steps 202 through 210, flat field correction values are determined for the infrared detectors of FPA 104 to correct for non-uniformities in optical path 150. In steps 212 through 220, flat field correction values are determined for the infrared detectors of FPA 104 to correct for non-uniformities in optical path 140. In steps 222 through 232, the flat field correction values associated with optical path 140 are subtracted from those associated with optical path 150 and the resulting supplemental flat field correction values are further processed. These supplemental flat field correction values may be applied to thermal image data obtained during subsequent operation of infrared camera 100.

Advantageously, the supplemental flat field correction values may be used to correct for non-uniformities associated with optical path 160 (e.g., the portion of optical path 150 external to shutter 110 and infrared detector package 106) that would not otherwise be correctable using only flat field correction values associated with optical path 140. Such non-uniformities may be attributable to, for example, window 170, optics block 116, mounting hardware of infrared camera 100, or other components of infrared camera 100. Also, the use of supplemental flat field correction values may reduce the effects of imperfections in window 105 (e.g., crop circles), FPA 104 (e.g., botches or tilted pixels), or shutter 110 (e.g., imperfections in the thermal black body presented by shutter 110 to FPA 104 (e.g., due to non-uniform temperature or heating of shutter 110)).

In one embodiment, the process of FIG. 2 may be performed while infrared camera 100 and the surrounding ambient environment are under thermally stable conditions at room temperature (e.g., in a temperature-controlled chamber) while infrared camera 100 is in a final configuration to be used for capturing thermal image data during normal operation of infrared camera 100. For example, in this embodiment, all mechanical and thermal components of infrared camera 100 (e.g., lenses of optics block 116, mounting hardware, and other components of infrared camera 100) may be mounted and powered on for at least ten minutes or until temperature sensor 128 indicates insignificant changes in temperature before the process of FIG. 2 is performed.

In another embodiment, the process of FIG. 2 may be repeated for different temperatures of the surrounding ambient environment and/or components of infrared camera 100. As a result, different supplemental flat field correction values may be determined for different temperatures.

In another embodiment, the process of FIG. 2 may be repeated for different configurations of infrared camera 100. For example, in different iterations of the process of FIG. 2, infrared camera 100 may be powered on and configured for capturing thermal images with different lenses in optics block 116 (e.g., different sizes of lenses or lenses provided by different manufacturers), different mounting hardware, and/or other components. As a result, different supplemental flat field correction values may be determined for different configurations of infrared camera 100, or different types of infrared cameras 100.

Calculations described herein with regard to the process of FIG. 2 may be performed in a localized or distributed manner as may be desired in particular applications. For example, in one embodiment, the calculations may be performed locally by infrared camera 100 (e.g., where processing and control block 120 is implemented as part of infrared camera 100). In another embodiment, the calculations may be performed by one or more external computer systems that interface with infrared camera 100 (e.g., where processing and control block 120 is implemented by such computer systems). In yet another embodiment, the calculations may be performed locally by infrared camera 100 and one or more external computer systems that interface with infrared camera 100 (e.g., where processing and control block 120 is implemented as part of infrared camera 100 and is also implemented by such computer systems).

Referring now to the particular steps in the process of FIG. 2, in step 202, infrared camera 100 begins performing a flat field correction (FFC) process for FPA 104 using thermal black body (TBB) 126 which is external to infrared camera 100. Accordingly, during step 202, processing and control block 120 controls motor 108 to remove shutter 110 from optical path 150.

In step 204, FPA 104 captures (e.g., acquires) two or more frames of thermal image data corresponding to infrared radiation received along optical path 150. For example, in one embodiment, FPA 104 captures eight frames of thermal image data which is passed to processing and control block 120.

In step 206, processing and control block 120 averages the thermal image data over the two or more frames received from FPA 104 to average out differences in the captured image values from frame to frame. In one embodiment, the value of each pixel is averaged for all values of the same pixel in the frame sequence captured in previous step 204. For example, if eight frames of thermal image data are captured in previous step 204, then the average value of each pixel is determined based on the eight values for the pixel captured in the eight frames of thermal image data.

Also in step 206, when determining the average value of each pixel, processing and control block 120 may chose to ignore one or more pixel values from one or more frames that fall outside a selected range when compared to the same pixels of the other captured frames. For example, if eight frames are captured in step 204, and if a particular pixel of one of the frames has a value that significantly differs from values associated with corresponding pixels of the remaining seven frames, then the pixel value of the one frame may skew the average pixel value determined for the eight frames. Accordingly, processing and control block 120 may choose to ignore the pixel value of the one frame and instead determine an average pixel value over the remaining seven frames. As a result, the accuracy of the thermal image data provided in step 206 can be improved.

In optional step 208, the pixel values are multiplied by a factor of two for convenient computation by processing and control block 120. In optional step 210, processing and control block 120 applies row and column spatial noise suppression to the multiplied average pixel values based on conventional processing techniques as would be understood by one skilled in the art.

Following the completion of step 210, flat field correction values will have been determined for all infrared detectors of FPA 104. In this embodiment, any infrared radiation detected by FPA during steps 202 to 210 includes non-uniformities associated with infrared detectors of FPA 104, optics block 116, or other components of infrared camera 100 which may contribute infrared radiation along optical path 150. Accordingly, differences in thermal data obtained during steps 202 to 210 correspond to the composite effect of all non-uniformities along optical path 150. Processing and control block 120 uses these data values to determine a flat field correction value for each pixel that results in a thermally calibrated data value for the pixel when the flat field correction value is applied to a thermal image captured along optical path 150 while thermal black body 126 is in place and shutter 110 is removed from optical path 150 (e.g., for a given calibrated temperature).

In step 212, infrared camera 100 begins performing a flat field correction of FPA 104 using shutter 110 as a thermal black body which is internal to infrared camera 100. Accordingly, during step 212, processing and control block 120 controls motor 108 to insert shutter 110 into optical path 150. As a result, FPA 104 is configured to receive infrared radiation along only optical path 140 (i.e., not the entire optical path 150).

Steps 214 through 220 are performed for optical path 140 in substantially the same manner as described above for steps 204 through 210 for optical path 150. Accordingly, following the completion of step 220, another set of flat field correction values will have been determined for all infrared detectors of FPA 104. In this embodiment, any infrared radiation detected by FPA during steps 212 to 220 includes non-uniformities associated with shutter 110, infrared detectors of FPA 104, and/or other components of infrared camera 100 which may contribute infrared radiation along optical path 140. Accordingly, any differences in thermal data obtained during steps 212 to 220 correspond to the composite effect of all non-uniformities along optical path 140. Processing and control block 120 uses these data values to determine a flat field correction value for each pixel that results in a thermally calibrated data value for the pixel when the flat field correction value is applied to a thermal image captured along optical path 140 while shutter 110 is inserted into optical path 150.

In step 222, processing and control block 120 subtracts flat field correction values associated with optical path 140 from those associated with optical path 150 to obtain a supplemental flat field correction value for each pixel (i.e., infrared detector) of FPA 104.

In steps 224 through 232, processing and control block 120 further processes the supplemental flat field correction values. For example, in step 224, processing and control block 120 applies kernel smoothing to the supplemental flat field correction values to minimize high-frequency noise in the previously acquired image data. The kernel smoothing of step 224 may be applied using any desired density (e.g., 3 by 3 pixels or other densities). This kernel smoothing may be repeated any desired number of times (step 226). In one embodiment, step 224 may be performed in accordance with the process of FIG. 3 or may be performed using conventional techniques as would be understood by one skilled in the art.

In one embodiment, processing and control block 120 may be configured to process only positive (e.g., zero or greater) supplemental flat field correction values during the kernel smoothing of step 224. In this embodiment, the supplemental flat field correction values may be offset by a desired positive number (e.g., an offset value of 1000) before step 224 is performed, which is then subtracted from the kernel smoothed field correction values after steps 224 and 226 are performed.

Although steps 224 and 226 have been described with regard to kernel smoothing techniques, other techniques may be used to smooth or otherwise reduce the differences between individual pixel values of the supplemental flat field correction values. Such techniques may include, for example, high frequency noise suppression techniques, pixel value blurring techniques, and/or other appropriate techniques as will be appreciated by one skilled in the art.

In optional step 228, processing and control block 120 divides the supplemental flat field correction values by a factor of two (e.g., if optional steps 208 and 218 were previously performed).

In step 230, processing and control block 120 scales the supplemental flat field correction values to an eight bit resolution corresponding to a range from −127 to 128 (e.g., using seven data bits and one sign bit). In this regard, an eight bit resolution may permit efficient usage of memory 124 during the processing of the supplemental flat field correction values while still providing sufficient resolution to adjust for non-uniformities present in thermal image data. In one embodiment, the flat field correction values associated with optical paths 140 and 150 determined in steps 202 to 220, as well as the supplemental flat field correction values determined in step 222, may have a fourteen bit resolution (e.g., corresponding to the resolution of individual infrared detectors of FPA 104). In this embodiment, the supplemental flat field correction values are scaled to a resolution of eight bits in step 230 as would be understood by one skilled in the art. In other embodiments, such as where larger adjustments are desired, higher bit resolutions may be used for the supplemental flat field correction values.

In step 232, the smoothed, scaled supplemental flat field correction values are stored as a supplemental flat field correction map which may be applied to thermal image data obtained during subsequent operation of infrared camera 100 to adjust for non-uniformities in optical path 160 (e.g., corresponding to the difference between optical path 150 and optical path 140).

Figure 3:
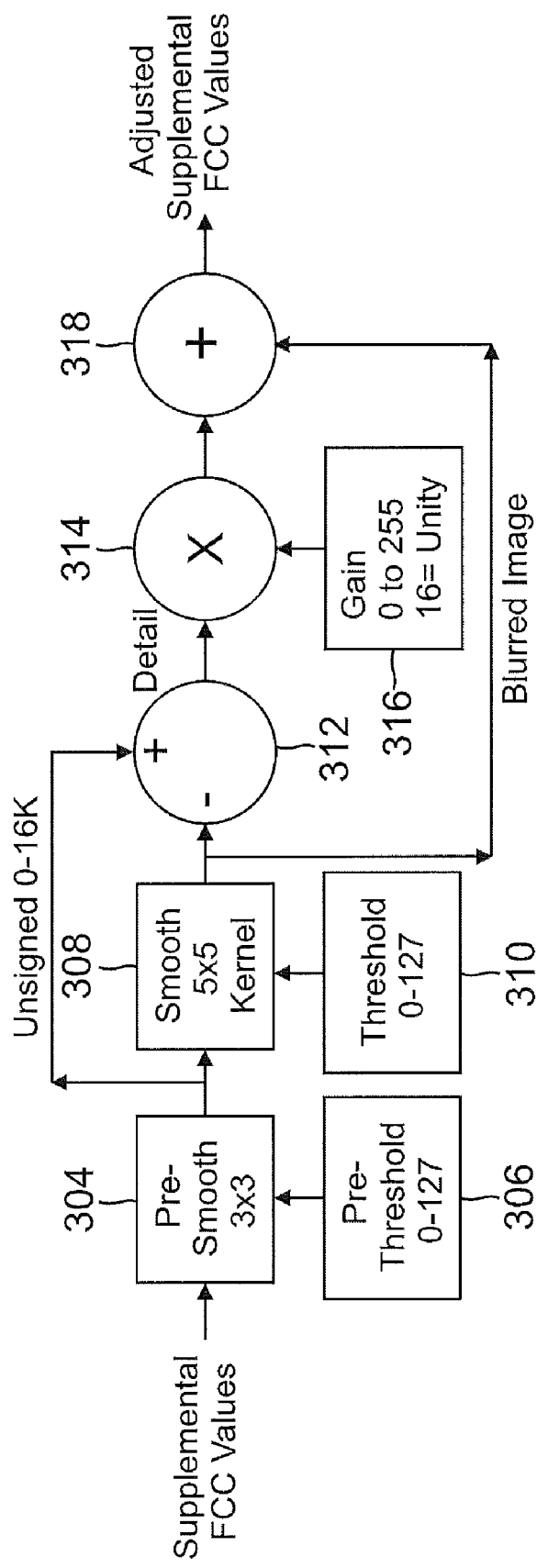
FIG. 3 illustrates a process of adjusting supplemental flat field correction values in accordance with an embodiment of the invention.

FIG. 3 illustrates a process of adjusting supplemental flat field correction values in accordance with an embodiment of the invention. For example, in one embodiment, the process of FIG. 3 may be performed by processing and control block 120 during step 224 of FIG. 2.

In step 304, processing and control block 120 performs a kernel smoothing on three by three pixel groups of the supplemental flat field correction values that were stored in step 232 of FIG. 2. A threshold value used to perform the kernel smoothing of step 304 is selected from a range of 0 to 127 (identified in step 306). As similarly discussed above with regard to steps 224 and 226, other techniques may be used in step 304 to smooth or otherwise reduce the differences between individual pixel values of the supplemental flat field correction values.

In step 308, processing and control block 120 performs a kernel smoothing on five by five pixel groups of the previously-smoothed supplemental flat field correction values. A threshold value used to perform the kernel smoothing of step 308 is selected from a range of 0 to 127 (identified in step 310). As similarly discussed above with regard to steps 224, 226, and 304, other techniques may be used in step 308 to smooth or otherwise reduce the differences between individual pixel values of the supplemental flat field correction values.

In step 312, the twice-smoothed supplemental flat field correction values determined in step 308 are subtracted from the once-smoothed supplemental flat field correction values determined in step 304. In step 314, a gain factor (identified in step 316) is applied to the difference values determined in step 312. In step 318, the gain-adjusted difference values (determined in step 314) are added to the twice-smoothed supplemental flat field correction values (determined in step 308) to provide adjusted supplemental flat field correction values.

Figure 4:
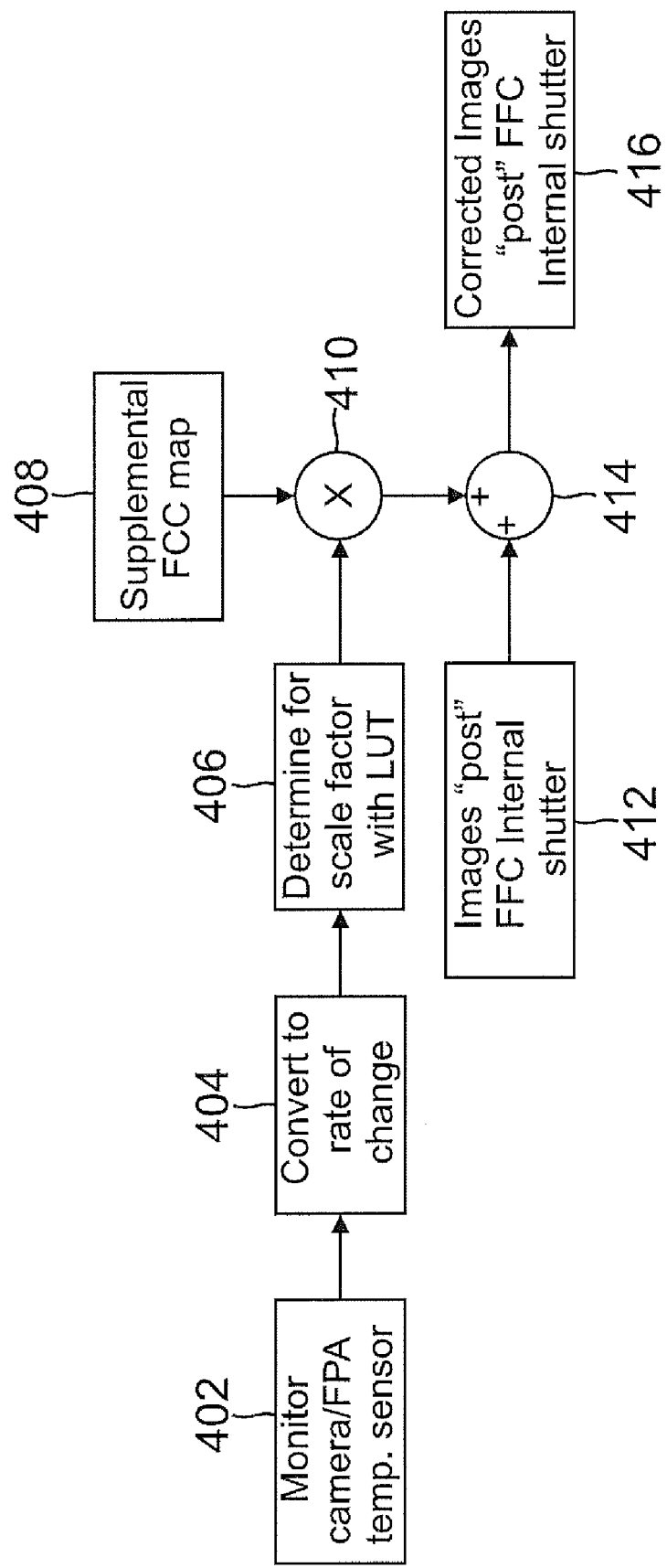
FIG. 4 illustrates a process of performing flat field correction in accordance with an embodiment of the invention.

FIG. 4 illustrates a process of performing flat field correction in accordance with an embodiment of the invention. For example, in one embodiment, the process of FIG. 4 may be performed by processing and control block 120 following the process of FIG. 2.

In step 402, processing and control block 120 monitors temperature sensor 128 and obtains temperature data for the components of infrared camera 100 and/or the ambient environment in which infrared camera 100 is positioned. In step 404, processing and control block 120 processes the temperature data to determine a rate of temperature change. For example, in one embodiment, the rate of temperature change may be integrated over a five second period of time to smooth out high frequency noise.

In step 406, processing and control block 120 determines a scale factor associated with the rate of temperature change determined in step 404. The scale factors may be used to adjust the amount of supplemental flat field correction applied to thermal image data in realtime during operation of infrared camera 100. For example, the following Table 1 identifies various scale factors which may be applied to the supplemental flat field correction values for different rates of temperature change:

TABLE 1

| Scale factor applied to supplemental flat field correction values | Temperature rate of change in degrees Celsius for five second period |
|---|---|
| 0.00 | 29 < temperature rate of change |
| 0.25 | 23 < temperature rate of change ≦ 29 |
| 0.50 | 15 < temperature rate of change ≦ 23 |
| 0.75 | 5 < temperature rate of change ≦ 15 |
| 1.00 | temperature rate of change ≦ 5 |

In step 408, appropriate supplemental flat field correction values are provided from memory 124. In one embodiment, the supplemental flat field correction values provided in step 408 are selected from a plurality of different sets of supplemental flat field correction values corresponding to different configurations of infrared camera 100. For example, as previously described, the process of FIG. 2 may be repeated for different infrared cameras 100 or different configurations of infrared camera 100 to store different sets of supplemental flat field correction values corresponding to various configurations of optics block 116, mounting hardware, and/or other components of infrared camera 100. Accordingly, in step 408, the supplemental flat field correction values corresponding to the current infrared camera 100 or current configuration of infrared camera 100 are selected.

In step 410, the supplemental flat field correction values (e.g., provided from memory 124 in step 408) are scaled (e.g., multiplied) by the scale factor determined in step 406. For example, as shown in Table 1, if the temperature rate of change is relatively stable (e.g., changing between zero and five degrees within a five second period), then a scale factor of 1.0 will be determined in step 406 and applied in step 410.

In contrast, if the temperature rate of change is relatively unstable (e.g., changing more than 29 degrees within a five second period), then a scale factor of zero will be determined in step 406 and applied in step 410. In this case, the supplemental flat field correction values will not be applied to thermal image data.

Other scale factors (e.g., 0.25, 0.50, or 0.75) may be determined and applied for other temperature rates of change as set forth in Table 1. Moreover, although particular scale factors and temperature rates of change are identified in Table 1, other scale factors and temperature rates of change are contemplated. In particular, the scale factors and temperature rates of change identified in Table 1 are dependant on the particular optical path 150 of infrared camera 100 and the desired amount of supplemental flat field correction that may be desired in particular applications. For example, in another embodiment, scale factors having increments of 0.1 may be used.

In step 412, processing and control block 120 applies the flat field correction values determined by steps 212 to 220 of FIG. 2 (e.g., determined for optical path 140 with shutter 110 inserted into optical path 150) to infrared detectors of FPA 104 to provide thermal image data that accounts for non-uniformities in optical path 140.

In step 414, processing and control block 120 also applies the scaled supplemental flat field correction values determined in step 410 to the thermal image data to account for non-uniformities in optical path 160. As a result, processing and control block 120 provides corrected thermal image data in step 416 which has been processed to account for non-uniformities along the full optical path 150 (e.g., corresponding to optical paths 140 and 160 together). Thus, by using supplemental flat field correction values determined for particular configurations of infrared camera 100, non-uniformities attributable to such configurations may be corrected.

Although only a single set of supplemental flat field correction values are identified in FIG. 4, it is contemplated that different sets of supplemental flat field correction values may be used depending on the particular infrared camera 100 used, the configuration of infrared camera 100, and/or detected temperatures or rates of temperature change. For example, in one embodiment, processing and control block 120 may be configured to extrapolate a single set of supplemental flat field correction values depending on detected temperatures or rates of temperature changes. In another embodiment, processing and control block 120 may be configured to select different sets of supplemental flat field correction values, or extrapolate between such values, depending on detected temperatures or rates of temperature changes. In yet another embodiment, such selections or extrapolations may be performed based on the particular infrared camera 100 used or the configuration of infrared camera 100.

Advantageously, the supplemental flat field correction values as described herein can be applied to thermal image data captured by FPA 104 to compensate for non-uniformities that may otherwise remain uncorrected by conventional shutter-based infrared detector calibrations. Such non-uniformities include, for example, image artifacts of infrared detectors of FPA 104 (e.g., botches or tilted pixels), image artifacts of window 105 (e.g., crop circles), and non-uniformities in the thermal black body provided by shutter 110 (e.g., caused by non-uniform internal heating).

Also, the use of supplemental flat field correction values can provide more accurate thermal image data which consequently reduces the frequency at which FPA 104 is recalibrated to the thermal black body provided by shutter 110. As a result, shutter 110 and motor 108 may be used less frequently which may improve their reliability.

In one embodiment, the use of supplemental flat field correction values may be selectively enabled or disabled as may be desired in particular applications. For example, in one embodiment, a user may selectively enable or disable the use of supplemental flat field correction values by interacting with a graphic user interface provided by infrared camera 100 or specifying a dynamic header of a graphical user interface (GUI) as will be understood by those skilled in the art. In another example, a provider of infrared camera 100 may specify default conditions to enable or disable the use of supplemental flat field correction values.

Where applicable, the various described embodiments may be implemented using hardware, software, or combinations of hardware and software. Also where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the spirit of the disclosure. In addition, where applicable, it is contemplated that software components may be implemented as hardware components, and vice-versa.

Software in accordance with the various described embodiments, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

I claim:

1. A method of calibrating an infrared camera, the method comprising:
   calibrating a focal plane array (FPA) of the infrared camera to an external scene to determine a first set of flat field correction values associated with a first optical path from the external scene to the FPA;
   calibrating the FPA to a shutter of the infrared camera to determine a second set of flat field correction values associated with a second optical path from the shutter to the FPA, wherein the second set of flat field correction values are different than the first set of flat field correction values;
   using the first and second set of flat field correction values to calculate a set of supplemental flat field correction values to apply to thermal image data obtained with the infrared camera; and
   storing the supplemental flat field correction values to apply to thermal image data of the infrared camera to adjust for non-uniformities associated with the first optical path.

2. The method of claim 1, comprising:
   capturing the thermal image data using the FPA; and
   applying the supplemental flat field correction values to the thermal image data to adjust for non-uniformities associated with the first optical path.

3. The method of claim 2, wherein the capturing the thermal image data comprises applying the second set of flat field correction values associated with the second optical path to infrared detectors of the FPA to adjust for non-uniformities associated with the second optical path.

4. The method of claim 1, wherein the supplemental flat field correction values are configured to adjust for non-uniformities associated with an optics block of the infrared camera in the first optical path.

5. The method of claim 1, comprising maintaining a plurality of sets of supplemental flat field correction values to adjust for non-uniformities associated with different lenses which may be selectively inserted into the first optical path.

6. The method of claim 1, comprising:
   determining a rate of temperature change; and
   scaling the supplemental flat field correction values in response to the rate of temperature change before applying the supplemental flat field correction values to the thermal image data.

7. The method of claim 1, comprising inserting the shutter into the first optical path before calibrating the FPA to the shutter.

8. The method of claim 1, wherein the shutter provides a thermal black body internal to the infrared camera, and wherein the shutter is disposed between the FPA and a lens of the infrared camera.

9. The method of claim 1, wherein the external scene comprises a thermal black body external to the infrared camera.

10. A non-transitory machine readable medium on which are stored non-transitory machine readable instructions for performing the method of claim 1.

11. An infrared camera, comprising:
    a focal plane array (FPA) adapted to capture thermal image data in response to infrared radiation received by the FPA;
    a shutter;
    a memory adapted to store a set of supplemental flat field correction values based on a first set of flat field correction values corresponding to a first optical path from an external scene to the FPA and based on a second set of flat field correction values corresponding to a second optical path from the shutter to the FPA; and
    a processor adapted to:
       calibrate the FPA to the shutter to determine the second set of flat field correction values associated with the second optical path from the shutter to the FPA;
       use the first and second set of flat field correction values to calculate the supplemental flat field correction values; and
       apply the supplemental flat field correction values to the thermal image data to adjust for non-uniformities associated with the first optical path.

12. The infrared camera of claim 11, wherein the processor is adapted to:
    calibrate the FPA to an external scene to determine the first set of flat field correction values associated with the first optical path from the external scene to the FPA;
    use the first and second set of flat field correction values associated with the first and second optical paths to calculate a second set of supplemental flat field correction values; and
    store the supplemental flat field correction values and the second set of supplemental flat field correction values in the memory.

13. The infrared camera of claim 11, wherein the FPA is adapted to apply the second set of flat field correction values associated with the second optical path to infrared detectors of the FPA to adjust for non-uniformities associated with the second optical path.

14. The infrared camera of claim 11, comprising an optics block in the first optical path, wherein the supplemental flat field correction values are configured to adjust for non-uniformities associated with the optics block.

15. The infrared camera of claim 11, wherein the memory is adapted to store a plurality of sets of supplemental flat field correction values to adjust for non-uniformities associated with different lenses which may be selectively inserted into the first optical path.

16. The infrared camera of claim 11, comprising a temperature sensor, wherein the processor is adapted to:
determine a rate of temperature change in response to the temperature sensor; and
scale the supplemental flat field correction values in response to the rate of temperature change before the supplemental flat field correction values are applied to the thermal image data.

17. The infrared camera of claim 11, wherein the shutter is adapted to be inserted into the first optical path before the FPA is calibrated to the shutter.

18. The infrared camera of claim 11, wherein the shutter provides a thermal black body internal to the infrared camera, and wherein the shutter is located between the FPA and a lens of the infrared camera.

19. The infrared camera of claim 11, wherein the external scene comprises a thermal black body external to the infrared camera.

20. A method of processing thermal image data captured by an infrared camera, the method comprising:
calibrating a focal plane array (FPA) of the infrared camera to determine a first set of flat field correction values associated with an external scene;
calibrating the FPA to determine a second set of flat field correction values associated with a shutter of the infrared camera;
calculating supplemental flat field correction values based on the first and second set of flat field correction values;
storing the supplemental flat field correction values;
capturing thermal image data with the FPA of the infrared camera; and
applying the supplemental flat field correction values to the thermal image data to adjust for non-uniformities associated with the infrared camera, wherein the supplemental flat field correction values are based on differences between the first set of flat field correction values obtained from the calibration of the FPA to the external scene and the second set of flat field correction values obtained from the calibration of the FPA to the shutter of the infrared camera.

21. The method of claim 20, wherein the capturing thermal image data comprises applying the second set of flat field correction values associated with the shutter to infrared detectors of the FPA to adjust for non-uniformities associated with the shutter.

22. The method of claim 20, wherein the supplemental flat field correction values are configured to adjust for non-uniformities associated with an optics block of the infrared camera.

23. The method of claim 20, comprising maintaining a plurality of sets of supplemental flat field correction values to adjust for non-uniformities associated with different lenses which may be selectively provided to the infrared camera.

24. The method of claim 20, comprising:
determining a rate of temperature change; and
scaling the supplemental flat field correction values in response to the rate of temperature change before applying the supplemental flat field correction values to the thermal image data.

25. The method of claim 20, wherein the shutter provides a thermal black body internal to the infrared camera, and wherein the shutter is disposed between the FPA and a lens of the infrared camera.

26. The method of claim 20, wherein the external scene comprises a thermal black body external to the infrared camera.

27. A non-transitory machine readable medium on which are stored non-transitory machine readable instructions for performing the method of claim 20.

* * * * *